United States Patent
Huang

(10) Patent No.: US 9,958,691 B2
(45) Date of Patent: May 1, 2018

(54) MULTI-VIEW DISPLAY DEVICE

(71) Applicant: DELTA ELECTRONICS, INC., Taoyuan (TW)

(72) Inventor: June-Jei Huang, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 2 days.

(21) Appl. No.: 15/238,719

(22) Filed: Aug. 16, 2016

(65) Prior Publication Data

US 2017/0285357 A1    Oct. 5, 2017

(30) Foreign Application Priority Data

Mar. 30, 2016  (TW) .............................. 105109962 A

(51) Int. Cl.
| | |
|---|---|
| *G02B 27/22* | (2018.01) |
| *G02B 3/00* | (2006.01) |
| *G02B 3/08* | (2006.01) |
| *G02B 5/02* | (2006.01) |
| *H04N 13/04* | (2006.01) |

(52) U.S. Cl.
CPC ....... *G02B 27/2214* (2013.01); *G02B 3/0062* (2013.01); *G02B 3/08* (2013.01); *G02B 5/0278* (2013.01); *G02B 27/22* (2013.01); *H04N 13/0404* (2013.01); *H04N 13/045* (2013.01); *H04N 13/0415* (2013.01)

(58) Field of Classification Search
CPC .. G02B 27/22; G02B 27/2214; G02B 3/0062; G02B 3/08; H04N 13/0415
USPC ............................................. 359/463; 353/31
See application file for complete search history.

(56) References Cited

U.S. PATENT DOCUMENTS

| | | | | |
|---|---|---|---|---|
| 6,831,678 | B1 * | 12/2004 | Travis ................. | G03H 1/2294 348/46 |
| 7,446,733 | B1 * | 11/2008 | Hirimai ................. | G02B 3/005 345/32 |
| 7,808,711 | B2 * | 10/2010 | Conley .............. | H04N 13/0404 348/51 |
| 7,948,681 | B2 * | 5/2011 | Conley .............. | G02B 27/2214 359/618 |
| 8,134,590 | B2 | 3/2012 | De Zwart et al. | |
| 9,055,287 | B2 * | 6/2015 | Conley .............. | G02B 27/2214 |
| 9,182,606 | B2 * | 11/2015 | Goulanian ......... | H04N 13/0447 |
| 9,261,703 | B2 * | 2/2016 | Huang ............... | G02B 27/2214 |
| 9,549,171 | B2 | 1/2017 | Huang | |

(Continued)

FOREIGN PATENT DOCUMENTS

| | | |
|---|---|---|
| CN | 102014289 A | 4/2011 |
| CN | 104950459 A | 9/2015 |

(Continued)

*Primary Examiner* — William R Alexander
(74) *Attorney, Agent, or Firm* — CKC & Partners Co., Ltd.

(57) ABSTRACT

A multi-view display device is provided, and the multi-view display device at least comprises a projector, a first lens set, and a second lens set. The projector contains a scan-lamp image, and the projector slants an incident ray corresponding to the scan-lamp image with a first angle. The first lens set receives the slanted incident ray and refracts that. The second lens set is slanted with the first angle, and the second lens set receives the slanted incident ray which is refracted by the first lens set and refracts that again, so as to expand a view area of the multi-view display device.

9 Claims, 6 Drawing Sheets

(56) References Cited

U.S. PATENT DOCUMENTS

| | | | | |
|---|---|---|---|---|
| 2002/0085287 A1* | 7/2002 | Egawa | ................... | G02B 3/005 |
| | | | | 359/619 |
| 2006/0227427 A1* | 10/2006 | Dolgoff | ................. | G02B 3/005 |
| | | | | 359/619 |
| 2007/0247590 A1* | 10/2007 | Schwerdtner | ...... | H04N 13/0404 |
| | | | | 353/7 |
| 2009/0115800 A1* | 5/2009 | Berretty | ............. | G02B 27/2214 |
| | | | | 345/690 |
| 2009/0160757 A1* | 6/2009 | Robinson | ............... | G09G 3/003 |
| | | | | 345/102 |
| 2011/0285968 A1* | 11/2011 | Huang | ................... | G03B 35/24 |
| | | | | 353/31 |
| 2013/0147854 A1* | 6/2013 | Huang | ................. | G03B 21/2013 |
| | | | | 345/690 |
| 2014/0293385 A1* | 10/2014 | Smithwick | ............... | G03H 1/26 |
| | | | | 359/9 |
| 2015/0215609 A1 | 7/2015 | Huang | | |

FOREIGN PATENT DOCUMENTS

| | | |
|---|---|---|
| TW | 201530250 A | 8/2015 |
| TW | 201544846 A | 12/2015 |

* cited by examiner

MULTI-VIEW DISPLAY DEVICE

RELATED APPLICATIONS

This application claims priority to Taiwan Application Serial Number 105109962, filed Mar. 30, 2016, which is herein incorporated by reference.

BACKGROUND

Field of Invention

The present invention relates to a multi-view display device.

Description of Related Art

In consideration of the current technology, the traditional auto stereoscopic three-dimensional (3D) displays are time-multiplexed multi-view display devices. A time-multiplexed multi-view display device sequentially projects a plurality of images to visual lines at different angles, the viewer's right eye and left eye can thus respectively receive images because of different parallax. Disadvantages of the time-multiplexed multi-view display devices include that spatial modulators with a high frame rate are required and system convergences will limit the view areas.

SUMMARY

The present invention provides a multi-view display device that slants the incident ray corresponding to the scan-lamp image and the lens set to obtain the effect of spatial multiplexing so as to exchange the reduced resolution for a larger view area. The viewable area of a common display device is thus enlarged.

An aspect of the disclosure is to provide a multi-view display device. The multi-view display device provides a spatial-multiplex number of M×N required to be added by a user so as to expand a view angle. M is a number of horizontal pixels, N is a number of vertical pixels, M and N are positive integers. The multi-view display device comprises a projector, a first lens set constituted by a lens array, and a second lens set constituted by a lenticular lens array. The projector contains a scan-lamp image. The projector slants an incident ray corresponding to the scan-lamp image with a first angle. The first lens set receives the slanted incident ray and refracts the slanted incident ray. The second lens set is slanted with the first angle and receives the slanted incident ray refracted by the first lens set and refracts the slanted incident ray refracted by the first lens set to allow a view area of the multi-view display device to have the spatial-multiplex number of M×N.

In one embodiment of the present invention, the first angle is defined as $\tan^{-1}(1/N)°$.

In one embodiment of the present invention, the multi-view display device further comprises a Fresnel lens disposed between the projector and the first lens, and the Fresnel lens is set for focusing the incident ray.

In one embodiment of the present invention, the multi-view display device further comprises a vertical diffuser receiving the slanted incident ray refracted by the first lens set and refracted by the second lens set and diffusing the slanted incident ray refracted by the first lens set and refracted by the second lens set to allow the view area of the multi-view display device to have the spatial-multiplex number of M×N.

In one embodiment of the present invention, the projector has a time-multiplex function.

In one embodiment of the present invention, number of spots scanned by the projector is X so that the number of the spots in the view area of the multi-view display device is M×N×X, where X is a positive integer.

In one embodiment of the present invention, a length D of the scan-lamp image is defined as cos(the first angle)/N* (screen pixel size).

In one embodiment of the present invention, a pitch of the second lens set L is M*N*D.

In one embodiment of the present invention, when the number of the spots in the view area of the multi-view display device is M×N×X, a resolution of the multi-view display device is reduced down to 1/M×N.

In one embodiment of the present invention, superimposing an X-lenticular lens array and a Y-lenticular lens array forms the first lens set.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
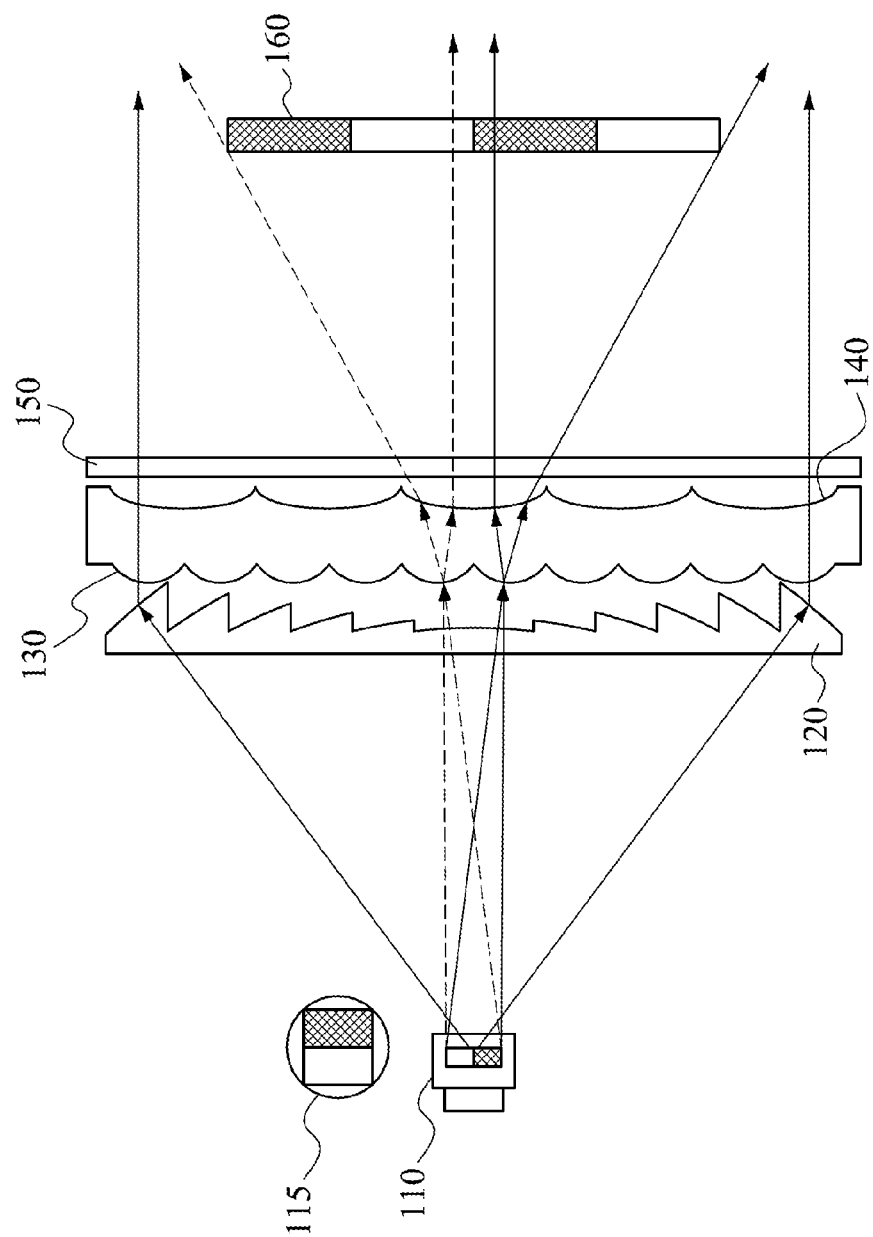
FIG. 1 depicts a schematic diagram of an arrangement of a multi-view display device that is not spatial multiplexed.

Reference will now be made in detail to the present embodiments of the invention, examples of which are illustrated in the accompanying drawings. Wherever possible, the same reference numbers are used in the drawings and the description to refer to the same or like parts.

The present invention provides a multi-view display device. Slanting the incident ray corresponding to the scan-lamp image and the lens set forms an angle enlarged screen, which can combine the technology advantages of spatial multiplexing and time multiplexing to expand the view area.

FIG. 1 depicts a schematic diagram of an arrangement of a multi-view display device that is not spatial multiplexed but is only time multiplexed. A description is provided with reference to FIG. 1. The multi-view display device comprises a projector 110, a Fresnel lens 120, a first lens set 130 constituted by a lens array, a second lens set 140 constituted by a lenticular lens array, and a vertical diffuser 150. The projector 110 has a scan-lamp image 115. Superimposing an X-lenticular lens array and a Y-lenticular lens array forms the first lens set 130. The Fresnel lens 120 achieves an equivalent optical effect as multiple lenses through dividing lens into theoretically indefinite concentric circle lines. Owing to these concentric circle lines, an overall thickness of the Fresnel lens 120 is decreased. The Fresnel lens 120 may also be regarded as a plurality of prisms arranged in a circular manner, with steeper edges and a smoother center convex surface. The multi-view display device disclosed in FIG. 1 achieves a multi-view display effect by using the Fresnel lens 120, the first lens set 130, the second lens set 140, and the vertical diffuser 150 to enlarge an angle.

Figure 2:
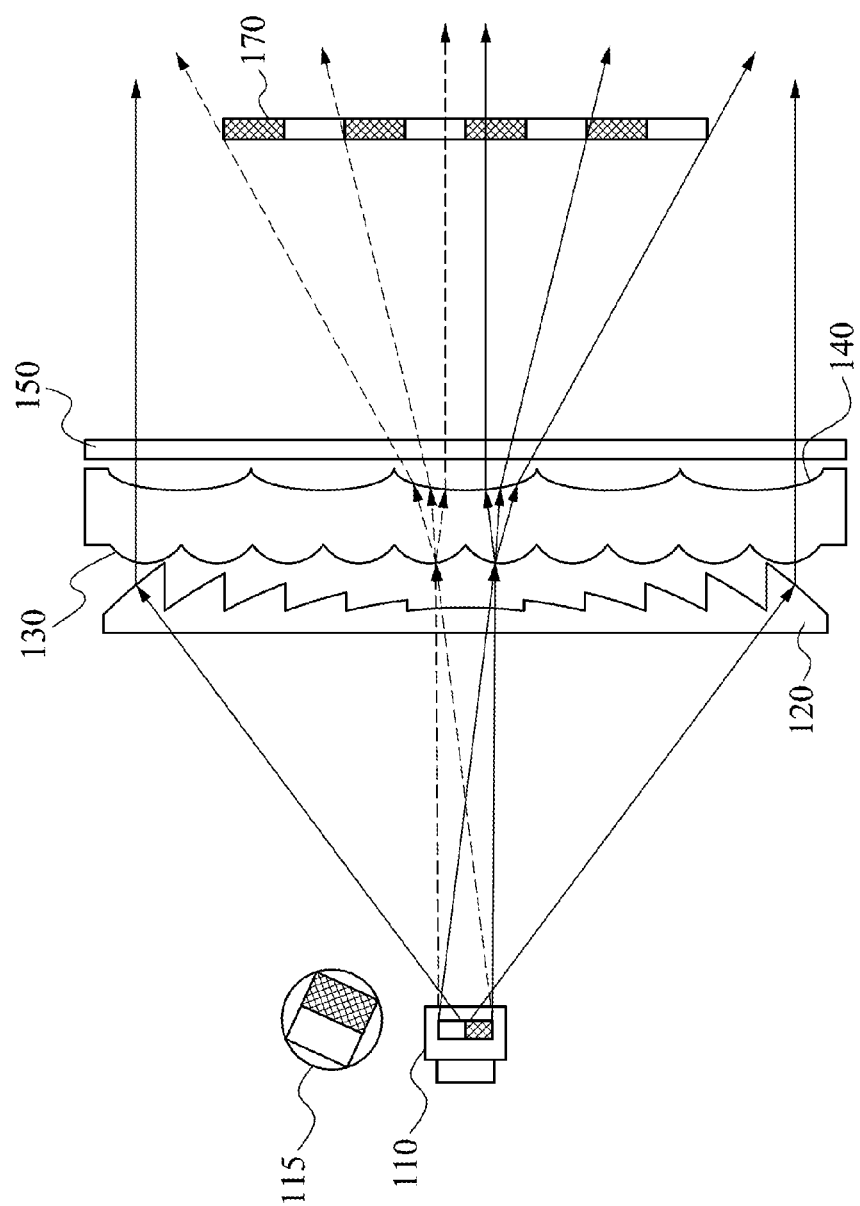
FIG. 2 depicts a schematic diagram of a structure of a multi-view display device according to a first embodiment of this invention.

FIG. 2 depicts a schematic diagram of a structure of a multi-view display device according to a first embodiment of this invention. Although the multi-view display device in FIG. 2 has a same structure as the multi-view display device shown in FIG. 1, however, the technology concept of spatial multiplex is incorporated in FIG. 2. The multi-view display device according to the present invention allows the multi-view display device that originally only utilizes time multiplexing to be added with the technical feature of spatial multiplexing so as to expand to a greater view area through slanting the projector 110 with respect to an incident ray corresponding to a scan-lamp image 115 and slanting the second lens set 140.

As mentioned above, the multi-view display device according to the first embodiment of the present invention has the technology concepts of time multiplex and spatial multiplex at the same time. The multi-view display device uses the projector 110 having a time-multiplex function, together with slanting the incident ray corresponding to the scan-lamp image 115 and slanting the second lens set 140, to obtain the effect of spatial multiplexing so as to exchange the reduced resolution for a larger view area. Through adding the effect of spatial multiplexing, the multi-view display device in FIG. 2 has a larger view area than the multi-view display device in FIG. 1, as can be seen from a difference between an image 160 shown in FIG. 1 thus formed after the scan-lamp image passes the lenses and an image 170 shown in FIG. 2 thus formed after the scan-lamp image passes the slanted lenses.

Figure 3:
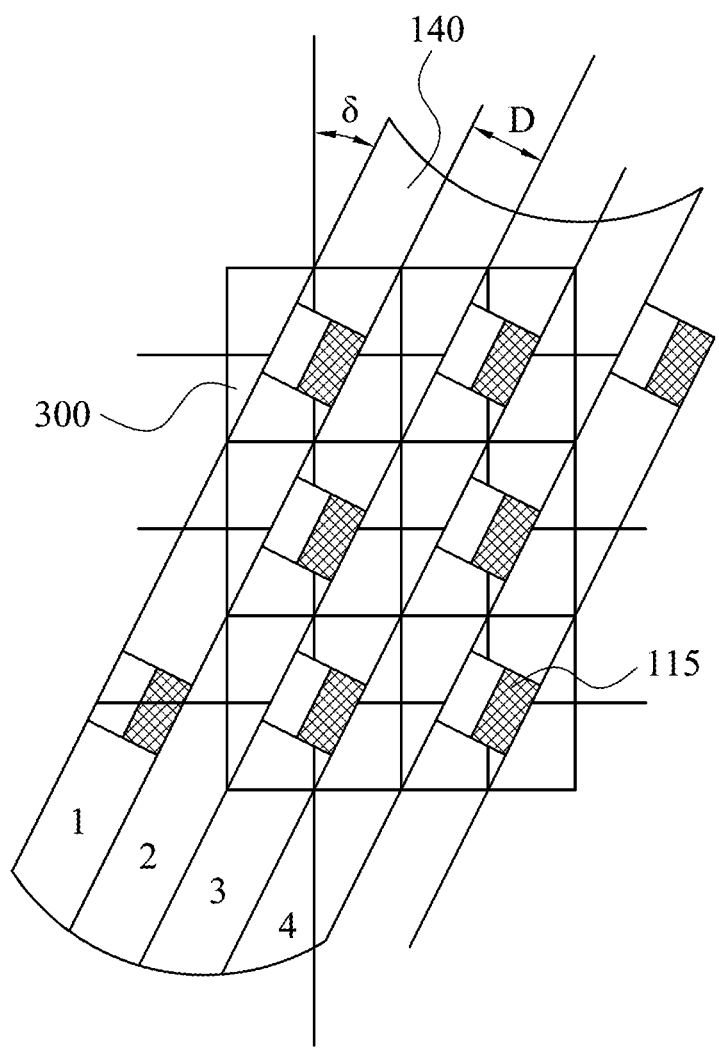
FIG. 3 depicts a schematic diagram showing a slanting operation of the multi-view display device according to the first embodiment of this invention.

FIG. 3 depicts a schematic diagram showing a slanting operation of the multi-view display device according to the first embodiment of this invention. Take FIG. 3 for example, M is a number of horizontal pixels, N is a number of vertical pixels, X is a number of spots scanned by the projector 110 having the time-multiplex function. M, N, and X are positive integers. After a slanting operation, the number of the spots in a view area of the multi-view display device according to the present invention will become M×N×X. A resolution of the mufti-view display device according to the present invention will be reduced down to 1/M×N. That is, the multi-view display device according to the present invention has M×N spatial multiplexing and X time multiplexing.

As for a slant angle δ with which the incident ray corresponding to the scan-lamp image 115 is slanted and the second lens set 140 is slanted, it can be calculated according to the equation $δ=\tan^{-1}(1/N)$. In other words, the slant angle δ may be adjusted by users depending on requirements. Take FIG. 3 for example, a user needs a spatial-multiplex number of 2×2, the slant angle $δ=\tan^{-1}(1/2)=26.6°$, at this time, M=2, N=2. Slanting the incident ray corresponding to the scan-lamp image 115 and the second lens set 140 with 26.6°, the spatial-multiplex number of 2×2 is thus obtained, as shown in FIG. 3. The length D of the scan-lamp image 115 can be obtained according to the equation $D=\cos(δ)N*$(screen pixel size). After calculating D through the known N and screen pixel size, a pitch L of the second lens set 140 can be calculated according to the equation L=M*N*D. When a user needs a spatial-multiplex number of 2×2, the slant angle δ of the incident ray corresponding to the scan-lamp image 115 and the second lens set 140 is firstly adjusted to 26.6°, and the first lens set 130 and the second lens set 140 are so positioned to have a required distance between them. Under the circumstances, 2*2=4 view areas can be displayed on the second lens set 140, which are respectively numbered as 1~4 in FIG. 3. In a screen pixel set 300, each of the view areas 1~4 has the scan-lamp image 115 in each 2*2=4 large grid pixels.

Figure 4:
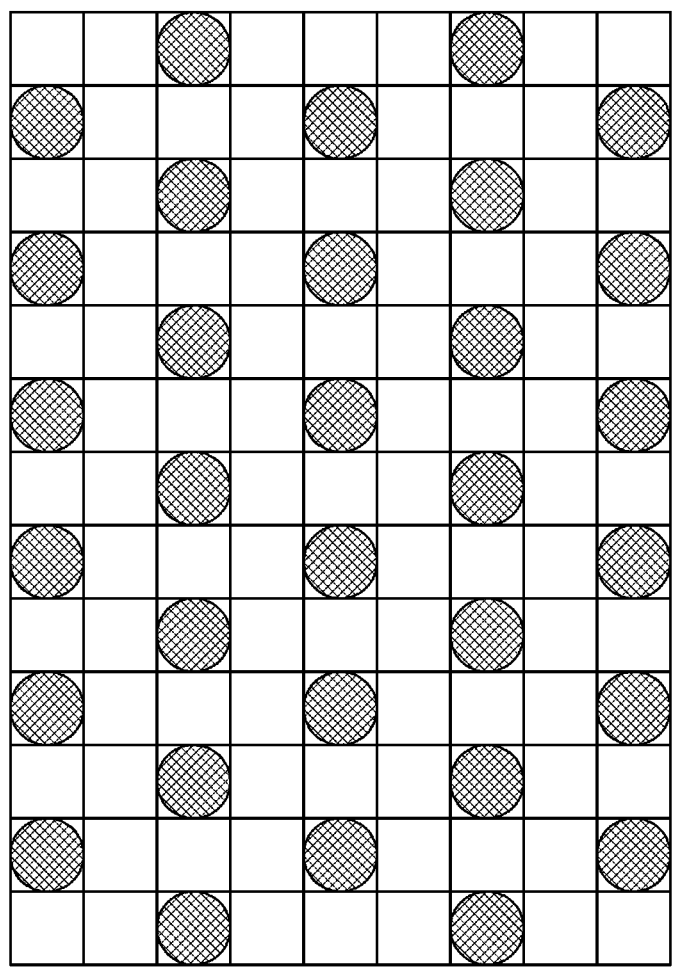
FIG. 4 depicts a schematic diagram of a screen display of the multi-view display device according to the first embodiment of this invention.

FIG. 4 depicts a schematic diagram of a screen display of the multi-view display device according to the first embodiment of this invention. Through the converging or diffusing effects of the Fresnel lens 120, the first lens set 130, the second lens set 140, and the vertical diffuser 150, and slanting the incident ray corresponding to the scan-lamp image 115 and the second lens set 140, a viewer can see a pixel configuration on a screen from a specific angle as shown in FIG. 4, that is, randomly taking 2*2 pixels will see only one pixel.

Figure 5:
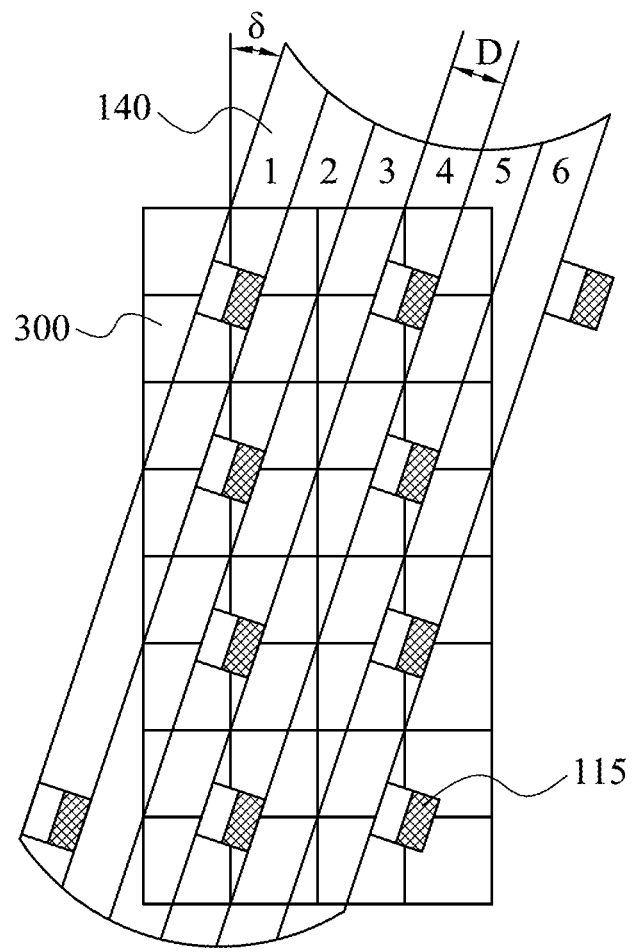
FIG. 5 depicts a schematic diagram showing a slanting operation of a multi-view display device according to a second embodiment of this invention.

FIG. 5 depicts a schematic diagram showing a slanting operation of a multi-view display device according to a second embodiment of this invention. Take FIG. 5 for example. M is a number of horizontal pixels, N is a number of vertical pixels, X is a number of spots scanned by the projector 110 having the time-multiplex function. M, N, and X are positive integers. After a slanting operation, the number of the spots in a view area of the multi-view display device according to the present invention will become M×N×X. A resolution of the multi-view display device according to the present invention will be reduced down to 1/M×N. That is, the multi-view display device according to the present invention has M×N spatial multiplexing and X time multiplexing.

As for the slant angle δ with which the incident ray corresponding to the scan-lamp image 115 is slanted and the second lens set 140 is slanted, it can be calculated according to the equation $δ=\tan^{-1}(1/N)$. The slant angle δ may be adjusted by users depending on requirements. Take FIG. 5 for example, a user needs a spatial-multiplex number of 2×3, the slant angle $δ=\tan^{-1}(1/3)=18.4°$, at this time, M=2, N=3. Slanting the incident ray corresponding to the scan-lamp image 115 and the second lens set 140 with 18.4°, the spatial-multiplex number of 2×3 is thus obtained, as shown in FIG. 5. The length D of the scan-lamp image 115 can be obtained according to the equation $D=\cos(δ)N*$(screen pixel size). After calculating D through the known N and screen pixel size, the pitch L of the second lens set 140 can be calculated according to the equation L=M*N*D. When a user needs a spatial-multiplex number of 2×3, the slant angle δ of the incident ray corresponding to the scan-lamp image 115 and the second lens set 140 is firstly adjusted to 18.4°, and the first lens set 130 and the second lens set 140 are so positioned to have a required distance between them. Under the circumstances, 2*3=6 view areas can be displayed on the second lens set 140, which are respectively numbered as 1~6 in FIG. 5. In the screen pixel set 300, each of the view areas 1~6 has the scan-lamp image 115 in each 2*3=6 large grid pixels.

Figure 6:
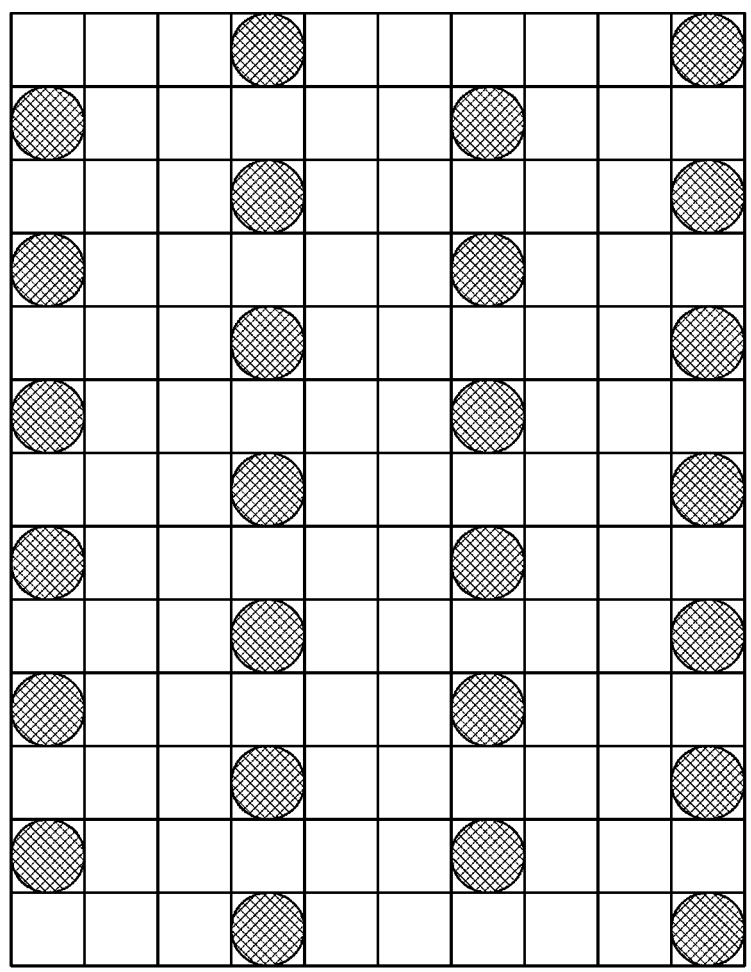
FIG. 6 depicts a schematic diagram of a screen display of the multi-view display device according to the second embodiment of this invention.

Next, FIG. 6 depicts a schematic diagram of a screen display of the multi-view display device according to the second embodiment of this invention. Through the converging or diffusing effects of the Fresnel lens 120, the first lens set 130, the second lens set 140, and the vertical diffuser 150, and slanting the incident ray corresponding to the scan-lamp image 115 and the second lens set 140, a viewer can see a pixel configuration on a screen from a specific angle as shown in FIG. 6, that is, randomly taking 2*3 pixels will only see one pixel.

In summary, the present invention provides a multi-view display device which slants the incident ray corresponding to the scan-lamp image and the lens set to obtain the effect of spatial multiplexing so as to exchange the reduced resolution for a larger view area. The viewable area is thus enlarged. Slanting the incident ray corresponding to the scan-lamp image of the projector having the time-multiplex function and the lens set forms an angle enlarged screen, which can combine the time-multiplex technology that is originally used with the newly added advantage of spatial multiplexing caused by the slanting technique so as to expand the view area.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A multi-view display device providing a spatial-multiplex number of M×N required to be added by a user, wherein M is a number of horizontal pixels, N is a number of vertical pixels, M and N are positive integers, the multi-view display device comprises:
    a projector containing a scan-lamp image, the projector slanting an incident ray corresponding to the scan-lamp image with a first angle; and
    a first lens set constituted by a lens array receiving the slanted incident ray and refracting the slanted incident ray; and
    a second lens set constituted by a lenticular lens array, the second lens set being slanted with the first angle and receiving the slanted incident ray refracted by the first lens set and refracting the slanted incident ray refracted by the first lens set to allow a view area of the multi-view display device to have the spatial-multiplex number of M×N, wherein the first angle is defined as $\tan^{-1}(1/N)°$.

2. The multi-view display device of claim 1, further comprising:
    a Fresnel lens disposed between the projector and the first lens, wherein the Fresnel lens is set for focusing the incident ray.

3. The multi-view display device of claim 1, further comprising:
    a vertical diffuser receiving and diffusing the slanted incident ray refracted by the first lens set and refracted by the second lens set and diffusing to allow the view area of the multi-view display device to have the spatial-multiplex number of M×N.

4. The multi-view display device of claim 1, wherein the projector has a time-multiplex function.

5. The multi-view display device of claim 4, wherein a number of spots scanned by the projector is X so that the number of the spots in the view area of the multi-view display device is M×N×X, where X is a positive integer.

6. The multi-view display device of claim 1, wherein a length D of the scan-lamp image is defined as cos(the first angle)/N*(a screen pixel size).

7. The multi-view display device of claim 6, wherein a pitch of the second lens set L is M*N*D.

8. The multi-view display device of claim 5, wherein when the number of the spots in the view area of the multi-view display device is M×N×X, a resolution of the multi-view display device is reduced down to 1/M×N.

9. The multi-view display device of claim 1, wherein the first lens set is formed by superimposing an X-lenticular lens array and a Y-lenticular lens array.

* * * * *